United States Patent [19]
Colwell et al.

[11] Patent Number: 5,809,425
[45] Date of Patent: Sep. 15, 1998

[54] GATEWAY FOR LOW COST ALPHANUMERIC PAGING ENTRY SYSTEM

[75] Inventors: Kevin Colwell, Middleton; Robert M. Engelke, Madison, both of Wis.

[73] Assignee: Ultratec, Inc., Madison, Wis.

[21] Appl. No.: 481,856

[22] Filed: Jun. 7, 1995

Related U.S. Application Data

[63] Continuation-in-part of Ser. No. 367,563, Jan. 3, 1995.
[51] Int. Cl.⁶ .............................. H04M 11/00; H04Q 7/00
[52] U.S. Cl. .......................... 455/466; 455/412; 455/31.2
[58] Field of Search .................................. 379/57, 58, 63; 340/825.44, 311.1; 455/38.1, 38.2, 466, 412, 31.2, 460

[56] References Cited

U.S. PATENT DOCUMENTS

| | | |
|---|---|---|
| Re. 32,365 | 3/1987 | Sebestyen . |
| 3,507,997 | 4/1970 | Weitbrecht . |
| 3,896,267 | 7/1975 | Sachs et al. . |
| 3,976,995 | 8/1976 | Sebestyen . |
| 4,126,768 | 11/1978 | Grenzow . |
| 4,188,665 | 2/1980 | Nagel et al. ............................ 395/865 |
| 4,201,887 | 5/1980 | Burns . |
| 4,268,721 | 5/1981 | Nielson et al. . |
| 4,415,065 | 11/1983 | Sandstedt . |
| 4,451,701 | 5/1984 | Bendig . |
| 4,569,421 | 2/1986 | Sandstedt . |
| 4,625,080 | 11/1986 | Scott . |
| 4,713,808 | 12/1987 | Gaskill et al. ......................... 379/57 X |
| 4,799,254 | 1/1989 | Dayton et al. . |
| 4,849,750 | 7/1989 | Andros et al. ..................... 340/825.44 |
| 4,868,860 | 9/1989 | Andros et al. ......................... 379/63 X |
| 4,918,723 | 4/1990 | Iggulden et al. . |
| 4,926,460 | 5/1990 | Gutman et al. . |
| 4,951,043 | 8/1990 | Minami . |
| 4,959,847 | 9/1990 | Engelke et al. . |
| 4,995,077 | 2/1991 | Malinowski . |
| 5,081,673 | 1/1992 | Engelke et al. . |
| 5,091,906 | 2/1992 | Reed et al. . |
| 5,095,307 | 3/1992 | Shimura et al. ................... 340/825.44 |
| 5,099,507 | 3/1992 | Mukai et al. .............................. 379/57 |
| 5,121,421 | 6/1992 | Alheim . |
| 5,128,980 | 7/1992 | Choi ...................................... 379/58 X |
| 5,163,081 | 11/1992 | Wycherley et al. . |
| 5,192,947 | 3/1993 | Neustein . |
| 5,249,220 | 9/1993 | Moskowitz et al. . |
| 5,280,516 | 1/1994 | Jang ......................................... 379/57 |
| 5,307,399 | 4/1994 | Dai et al. ................................. 379/57 |
| 5,325,417 | 6/1994 | Engelke et al. . |
| 5,327,479 | 7/1994 | Engelke et al. . |
| 5,339,358 | 8/1994 | Danish et al. . |
| 5,343,519 | 8/1994 | Feldman . |
| 5,351,288 | 9/1994 | Engelke et al. . |
| 5,359,651 | 10/1994 | Draganoff . |
| 5,377,263 | 12/1994 | Bazemore et al. . |
| 5,396,650 | 3/1995 | Terauchi . |

FOREIGN PATENT DOCUMENTS

| | | |
|---|---|---|
| 2749-923 | 5/1979 | Germany . |
| 60-259058 | 12/1985 | Japan . |
| 93/23947 | 11/1993 | WIPO . |

Primary Examiner—David R. Hudspeth
Assistant Examiner—Scott Richardson
Attorney, Agent, or Firm—Quarles & Brady

[57] ABSTRACT

A low cost alphanumeric paging entry system is based on a low cost paging (LCP) device to enter paging messages remotely from any telephone. The device is designed to minimize the needs for user training and is intended for intuitive operation by the user. The device uses simplex communications, using a system of Baudot tones, to send the paging message to the paging system for transmission to the intended recipient. A gateway is a device intended to interface between such an LCP device and an otherwise conventional paging system. The gateway provides a series of audible prompts to the user to facilitate easy and intuitive entry of the paging message to the gateway. The gateway then re-formats the paging message into a standard digital paging message format and re-transmits the message to a pagan system for transmission to the recipient.

8 Claims, 7 Drawing Sheets

GATEWAY FOR LOW COST ALPHANUMERIC PAGING ENTRY SYSTEM

CROSS-REFERENCE TO RELATED APPLICATION

This is a continuation-in-part of U.S. application Ser. No. 08/367,563 filed Jan. 3, 1995.

FIELD OF THE INVENTION

The present invention relates to the general field of radio personal pagers and relates specifically to a low cost device and system for the input of alphanumeric characters into an alphanumeric paging system.

BACKGROUND OF THE INVENTION

Personal pagers are small battery powered devices worn by individuals so that messages can be transmitted to them by radio frequency from a remote message sender. The currently available pagers are of two general categories. Numeric only pagers are capable of receiving only a single type of message, i.e. a numeric message, which is typically the telephone number of the person sending a message to the person being paged. Alphanumeric pagers, by contrast, permit the transmission of both language as well as numeric information, and thus permit the transmission of short messages to an individual being paged. Both pagers rely on a network of radio transmitters and particularized identification codes, referred to as a personal identification number (PIN) so that each particular individual who is wearing a pager can be identified when a page is intended for that individual.

Paging systems operate on the basis of a paging center which transmits out coded information, on an assigned radio frequency, to all of the pagers associated with that paging system. The particular personal pager which has its identification code, termed a CAP code, contained in any particular transmission at an assigned frequency is the only one that receives and displays the transmitted message. If a system is operated by a central dispatcher, which is the only station sending paging messages to the various pagers in the field, it is not a particular problem to devise a method for the input of the numeric or text information into the paging system. However, when paging services are offered to the public at large, and large and small businesses broadly, the methods by which paging information or paging messages are provided as inputs to the alphanumeric paging system becomes a greater logistical and technical problem.

For numeric pagers, the input of numeric information into the paging system is a relatively straight forward proposition. A sender desiring to send a page dials the paging system, which is typically operated by a robotic or computer controlled device. The system device tells the user, with appropriate computerized voice cues, to enter the information as to the PIN of the person to be paged and the numeric message to be sent in the page message, with the user entering that information by pressing tones on his or her digital dial pad telephone. The tones generated by a dial pad on a telephone, known as DTMF, can convey numeric information to the paging station, which can then transmit the page message to the desired individual.

With alphanumeric paging systems, the process is a little more complicated, because of the demands of entering text or alphanumeric data at some point into the system. One type of system utilizes a live operator who answers a call in voice and then receives the message verbally over the telephone line from the remote caller. The operator then enters the text information into a keyboard associated with the paging transmission unit, and the page is properly formatted and sent to its intended recipient. However, this method is relatively expensive, in that it requires a system of stand-by operators available at all times, and does not provide the speed and privacy that many users would like in an alphanumeric paging system.

Current alphanumeric paging systems accept textual information from remote data entry points using any one of a number of common protocols. One such protocol, and perhaps the most common, is known as the telocator alphanumeric protocol (or TAP). TAP was designed to facilitate transmission from computer to computer of the input information for alphanumeric paging systems. Thus, TAP is a convenient system for use by page senders having convenient access to personal computers. In one sense, the TAP protocol is not a communication protocol, since it relies on conventional computer-to-computer modem communications. Any of several modem protocols may be used for the actual modulation protocol. For example, the current TAP protocol recommends that a Bell 103 compatible modem be used to transmit 300 Baud information. Other speeds or modem types can be used as appropriate. As usual, all such modems operating under standard ASCII or CCITT protocols for computer transmission of information require handshakes, both send and receive capability, and full duplex capability. The TAP protocol is intended to define within the transmission from a remote computer or digital facility to a paging terminal how the data internally in the packet is characterized so that the receiving terminal can recognize the PIN and identify the message to be transmitted to the individual to be paged. Other alphanumeric paging entry protocols are also in common use, all of which are also based on standard computer communication methods.

The availability of TAP-based alphanumeric paging terminals allows users with remote computers to input alphanumeric paging messages to be transmitted by the paging system. While this expands the network of available senders of an alphanumeric paging message, it still requires the expense and often the bulk of a computer, or at least a device with full duplex handshake modems, with specific software, in order to properly enter alphanumeric information into the system.

Another limitation of present paging systems is that the paging system must bill the recipient, either on a monthly basis or on the basis of the number of pages received. For systems in which users call in to a human operator, charging access to the person originating the page message is awkward and inconvenient. It would be desirable for some applications if a paging system could operate like a conventional telephone system in which the caller is the one who is charged. Such a caller-charge system would facilitate the acceptance of pagers, since the receiver of the pages does not have to pay for the pages received.

SUMMARY OF THE INVENTION

The present invention is summarized in that a small hand-held, battery-powered low cost paging (LCP) entry device is capable of transmitting alphanumeric messages in a special code format to the input terminal to an alphanumeric paging system. The device includes a keyboard, a display, and provides as its principle output a tone sequence out of its speaker which can be fed into to the input microphone of a conventional telephone handset. The device is programmed to provide, in a defined format, just the information to the remote terminal necessary to effectuate the alphanumeric page to the intended recipient.

It is an object of the present invention to provide an extremely low-cost alphanumeric paging entry device which can be made, on a commercial scale, quite cheaply and which can be widely available for use at any remote location to enter alphanumeric messages into an alphanumeric paging system.

It is another object of the present invention to provide a remote hand-held paging device which avoids the necessity for having full duplex communication and two-way hand-shaking with the remote terminal, and the expense associated with that capability, by utilizing the user as a feed back device to control its operation.

It is also an object of the present invention to define a gateway for remote alphanumeric paging information station which can be used by the low cost pagers of the present invention to transfer information into the conventional TAP protocol alphanumeric paging message entry system.

It is a feature of the present invention in that it can track the identification of the person originating the page so that the sender could be charged for the paging message rather than the recipient.

Other objects, advantages, and features of the present invention will become apparent from the following specification when taken in conjunction with the accompanying drawings.

DETAILED DESCRIPTION OF THE INVENTION

1. Low Cost Paging (LCP) System

In order to understand the low cost paging gateway of the present invention, it is first necessary to understand the operation and advantages of the low cost paging network of which the gateway is to be a part. Since that network is designed to operate with a novel low cost paging alphanumeric entry device, that device will also be described first.

In the alphanumeric paging entry system, it is envisioned that there shall be a low cost alphanumeric entry device and a receiving station. The receiving station may be incorporated into a redesigned model of terminal for a paging service or can be configured as a separate stand alone device, referred to here as a gateway, which transfers alphanumeric text from the low cost alphanumeric entry device (sometimes abbreviated "AED") into an otherwise conventional paging system. The initiating device, i.e. the low cost alphanumeric entry device, will be described first, together with its use, followed by a discussion of the other attributes of the system.

In order to be consistent in terminology, several terms will be user with specific meanings throughout this specification. The system described here will often be referred to as a low cost paging or LCP system. The communication protocol described here will sometimes be called the LCP protocol, and the device described below for input will sometimes be referred to as an LCP device. The person using the LCP device to send a page will be referred to as the user, the caller or the sender, while the person being paged is referred to as the recipient. In current wireless paging networks, the electronic center into which paging information is entered, in a computer modem protocol and the TAP format, for transmission to the recipients is conventionally called a terminal, and that terminology is used here. It is envisioned that, at some point in the future, terminals will be adapted to receive LCP format messages, but currently they cannot. Another device is therefore envisioned which can receive LCP messages from the LCP device and then reformat and re-transmit that message, in a conventional modem format such as TAP to a conventional paging system input terminal. That new device is here called a "gateway," which is a new usage of that term to refer to this new class of device.

The understand the function and operation of the gateway, and its possibilities, it is first necessary to understand how and LCP input device and the LCP system as a whole function.

2. Low Cost Paging (LCP) Device

Figure 1:
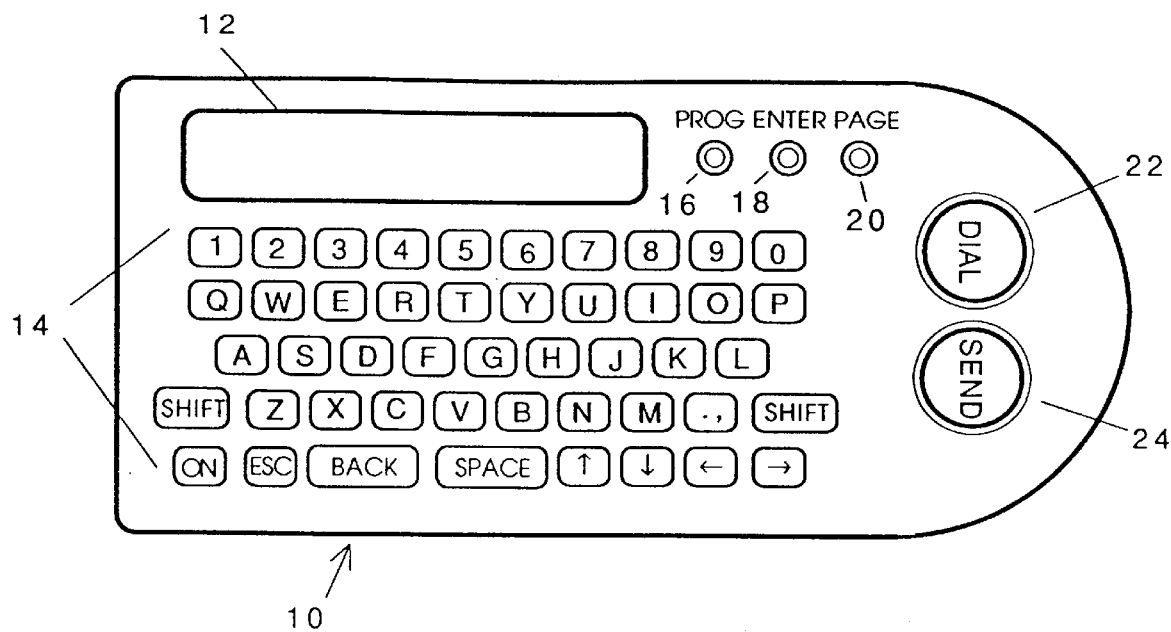
FIG. 1 is a top plan view of a hand-held alphanumeric paging device to which the gateway of in accordance with the present invention is intended to communicate.
Figure 2:
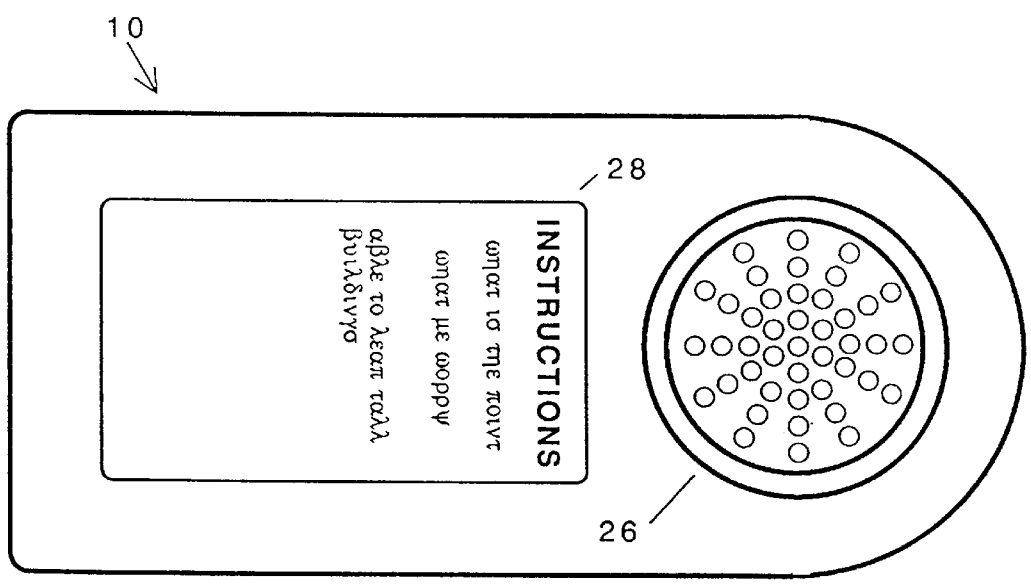
FIG. 2 is a rear plan view of the device of FIG. 1.

Shown in FIGS. 1 and 2 is a front and back view of the low cost alphanumeric paging entry device, generally indicated at 10 in both FIGS. 1 and 2. This LCP device 10 is a small, compact, pocket-size device approximately the size and weight of a pocket calculator. On its front face, the paging device 10 includes an alphanumeric display 12, which can be liquid crystal, LED, or any suitable alphanumeric display assembly which can readily be driven by battery power. Underneath the liquid crystal 12 is a keyboard, generally indicated at 14, containing all the conventional keys of a conventional typewriter or computer keyboard, although reduced somewhat is size.

In the upper right hand corner of the device are three special buttons unique to this device. A program button entitled "PROG" is indicated at 16, an "ENTER" button is indicated at 18 and a button indicated at 20 is labeled "PAGE." Finally, on the right hand side of the front of the low cost alphanumeric entry device are two large and conspicuous buttons located at one end of the device, without any smaller buttons adjacent to them. One such button, designated 22, is entitled "DIAL" while the other button has a legend on it which reads "SEND." These particular buttons are larger than the rest of the keys on the device, and are intended to be approximately finger size of a normal adult. In order to fit the remaining keys on the device and still have it be a modest size, the keyboard 14 itself is of relatively small size including rubber keys of the type normally associated with hand held calculators.

Shown in FIG. 2 is the reverse side of the hand held paging device 10 shown in FIG. 1. Two conspicuous features are apparent. One feature is an audio speaker designated at 26. The other feature is a panel of indicia, indicated at 28, on which instructions for the use of the device may be printed. Not shown, but incorporated into the design, are features for containing and replacing the battery contained within the device 10.

Figure 4:
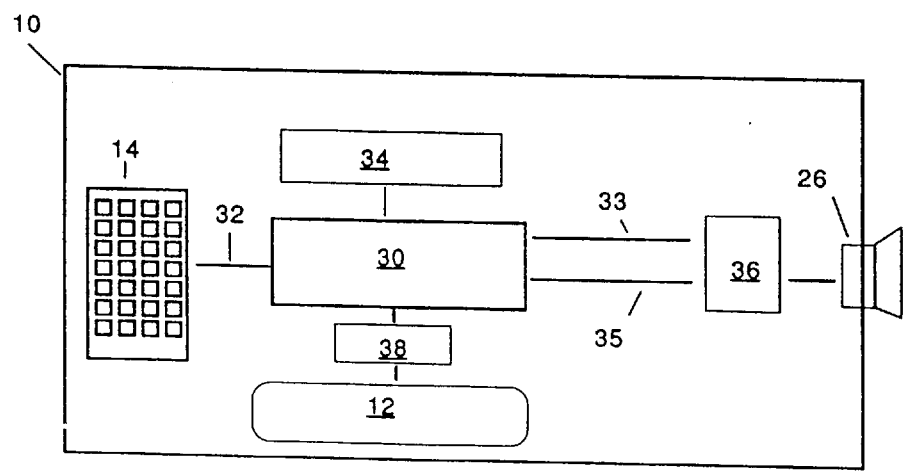
FIG. 4 is a schematic illustration of the electronic components of the device of FIG. 1.

Shown in FIG. 4 is a schematic outline of the internal electronic components contained within the device 10. As can be seen with reference to FIG. 4, the internal components of the device 10 can be simple indeed. There is a microprocessor designated 30 which includes a connection designated 32 so as to be capable of receiving input from the keyboard 14. A separate keyboard buffer integrated circuit is also possible to transmit information to the microprocessor 30. An ROM, or read only memory, 34 is provided to contain the programming for the microprocessor 30. The outputs from the microprocessor 30 include two direct digital output lines 33 and 35. The output line 33 is a parallel bus of an appropriate number of bits to produce DTMF and is fed through a very simple resistive tree-type D/A converter 37 to directly generate DTMF tones from the microprocessor output. The other digital microprocessor output 35 is provided as input to a speaker driver 36, combined with the output of the DTMF converter 37, and is connected to the audio speaker 26. An optional speaker driver 39 may be used to buffer the digital output of the microprocessor so as to filter the square edges of its digital output and, if necessary, slightly amplify the output to make it louder. The microprocessor 30 is also connected to a display driver 38 which drives the alphanumeric display 12.

Before describing the operation of the alphanumeric paging entry device 10 in detail, it is helpful first to understand what the intended function of the LCP device 10 is. A user may use the device 10 to formulate and construct an alphanumeric message which is then to be transmitted over conventional telephone lines to an LCP gateway which will convert the message to a form (e.g. to TAP) which can be transmitted to a terminal from where the message is sent over the wireless alphanumeric paging system to be ultimately received by the recipient's pager. In order to facilitate making the device 10 of the lowest possible cost and maximum ease of use, the LCP device 10 does not include any capability to receive or detect tones or communications back from the telephone line. It is a one-way communicating device which requires the participation of the user to successfully operate and introduce a message into the paging system.

Figure 3:
FIG. 3 is a sketch of the method of utilization of the device of FIGS. 1 and 2 in its normal operation.

In the simplest summary of its operation, the user types a message off-line into the LCP device 10, using the keyboard 14, following cues from the device. Once the message has been formulated, the user then picks up a telephone handset. The user then places the LCP device 10 physically on the handset of the telephone, such that the speaker 26 of the LCP device 10 is adjacent to the microphone of the handset. This is illustrated in FIG. 3. If the telephone is a coin telephone, the user would then have to insert the appropriate fee. Then the user utilizes only the two large and convenient buttons 22 and 24 to operate the device 10. When the user presses the DIAL button 22, the LCP device 10 will automatically present DTMF tones into the telephone to dial the telephone number which has been pre-programmed into it, which number is the telephone number of the LCP gateway, or an LCP terminal. The user listens through the ear piece or speaker of the telephone handset while this is done. It may be desirable to have the output sound generated by the gateway be particularly loud, so that the user does not have to hold the handset very near his ear, to permit access to buttons on the device 10 while listening. Once the gateway, or LCP capable terminal, answers, the user will hear an audible prompt, in language form or by means of a specific tone or signal, either from a human being or from a machine. The message might say "you may transmit your message now," or "send page now," for example, or might be a specific number of tones of specified pitch. The user then presses the SEND button 24 on the device 10, and the LCP device 10 then automatically transmits the alphanumeric message entered by the user across the telephone line, in LCP format, to the device at the other end of the line. If the message is correctly received, as will be discussed further below, the gateway or LCP terminal then provides yet another audible feedback to the user by a message, such as one saying "message received, thank you" or the equivalent indication conveyed by a series of tones.

One even more economical alternative is to omit the dialing option from the device 10. In that event, the device 10 would only display the telephone number of the gateway, and the user would manually dial the system. The gateway would still need to produce the human audible signal for the user to press the SEND key to transmit the LCP page. The cost advantage of this approach is that the D/A converter necessary to generate DTMF tones could then be eliminated.

3. Low Cost Paging (LCP) Protocol

It is not anticipated that the device 10 would operate in accordance with the existing TAP (or other paging system) protocol. The existing paging input protocols all require full duplex communication and a modem-compatible handshake as a part of the initiation of a digital information transmission. Incorporating the capability to receive and decoded audible signals, and to conduct an ASCII handshake, would require electronics in a paging entry device which would raise its cost to levels significantly higher than are necessary. Instead, the LCP device 10 transmits in a different code format, an enhanced and altered version of a communications format known as Baudot, which has been previously used almost exclusively in devices known as TDDs, or telecommunication devices for the deaf, also known as text telephones. In conventional Baudot communications, a space is indicated by a tone of 1800 hertz while a mark, or logical one, is indicated by a tone of 1400 hertz. By alternating these two tones, differential bits of a digital message can be transmitted from one station to another. The conventional Baudot protocol and format is a simplex code, which does require or support duplex communication and which does not require or support machine-to-machine handshaking to initiate a communication.

Here, it is preferred that the device 10 operates under an enhanced Baudot protocol. One such enhanced Baudot protocol, referred to as Turbo Code, is described in greater detail in published PCT patent application WO 93/23947, the disclosure of which is herein incorporated by reference. Turbo code uses the Baudot tones (1400 and 1800 Hz) for the one's and zero's of its digital communications format, but operates at an increased speed over conventional Baudot and uses the ASCII character set rather than the idiosyncratic Baudot character set. Turbo Code does normally require a simplified synchronization process at its initiation, but the LCP device 10 and its protocol modifies that procedure to dispense with this synchronization process, since the LCP device 10 is not capable of receiving signals. However, the LCP device 10 preferably transmits code in the format of the Turbo Code code system at an average of about 100 Baud, and utilizing the ASCII character set, rather than a Baudot character set. The use of Baudot tones for information transmission makes use of a communication protocol having a long history of successful use and one which, unlike for example using DTMF tones for information transfer, permits an information string of reasonable length to be transmitted through the telephone in a short time period. For example, a 30 character message can be send by an LCP device operating as described her in about 6 seconds. The use of the ASCII character set, as opposed to the Baudot character set, allows for the use of conventional and widely available character look-up tables in the receiving equipment and supports foreign languages and characters.

It should be understood that the use of this simplex, simple tone, protocol actually speeds up, rather than slows down, the transmission of a paging message to the terminal, even though its theoretical transmission speed may be less that of computer modems. It should be understood that most paging messages are short, typically less than fifty characters. All duplex computer modem protocols require a duplex "hand-shake" process by which the two devices on the line signal each other as to the protocol and timing of the subsequent communications. The LCP device of the present invention can send a typical entire paging message of thirty five characters in the time period required for such a hand-shake to occur. Thus this simplex protocol, contra-intuitively, can be actually faster than the currently used protocols in the entry of the paging message into the paging system.

The format and protocol used to transmit the message is of importance to the most efficient and most economical functioning of the system in accordance with the present invention. The LCP system makes use of the Baudot tones 1400 and 1800 Hertz, but uses a conventional ASCII character set, as described above. The message format for a message for the low cost paging system in accordance with the present invention is as follows:

SYNC, SYNC, ST, USER-ID, FR, SYSTEM-NUMBER, FR, PIN-NUMBER, FR, MESSAGE, FR, CHECK SUM, EOT

In the above message format, the term "SYNC" refers to a synchronization signal developed for the Turbo Code enhanced Baudot communication protocol which has the effect of informing a Baudot device that a message is being transmitted in the enhanced Baudot code known as Turbo Code. The SYNC character is transmitted twice to identify the packet as being in Turbo Code format and to ensure proper synchronization of the receiving equipment so that proper processing of the following signal can begin. The term "ST" refers to a start control character necessary to delimit the start of a variable width field to follow. The character "FRI" refers to a frame control character which is again intended to delimit the size of the variable length field which it follows or precedes and thus indicate the bounds of that field. The character "EOT" is an end of text character indicating that the transmission is complete.

The field entitled USER-ID is the identification number of the user or caller. The purpose of this number is to permit the LCP system to be implemented in a way, if desired, to permit the billing for paging messages sent to be the financial responsibility of the user or caller rather than of the recipient. The technology of the present invention makes possible automated billing of paging usage to the user or caller in a manner not readily feasible using the prior technologies. Each of the devices 10 would be assigned an USER-ID number that would identify it to the LCP system, and the gateway or LCP terminal would capture the USER-ID number as a part of its reception of the message. Later the system would assemble the usage information for billing, analogously to billing long-distance telephone charges. The gateway may also check, during message reception, to see if the particular caller is authorized and current on their bill, and would issue a verbal message indicating if paging access is denied for billing or credit reasons. Thus the LCP system offers the possibility, if desired, for charging per page to the sender, although traditional charging to the recipient is, of course, still feasible and may be preferred in some systems.

The message intended for the recipient is indicated at "MESSAGE" in the format above. The "PIN-NUMBER" represents the personal identification number of the recipient to be paged and the "SYSTEM-NUMBER" indicates, for a low cost paging gateway the telephone number of the alphanumeric paging system which it is to dial. If the LCP gateway is integrated into an alphanumeric paging system so that the terminal can receive LCP messages, then it becomes desirable to eliminate the SYSTEM-NUMBER from the low cost paging message format. The CHECK-SUM is used to verify that the message packet is correctly transmitted and received. The CHECK-SUM is a running 14 bit addition of the ASCII values for all of the characters in the entire message packet following the initial ST character and through the FR character ending the message field. The receiving LCP gateway or terminal would always keep a running sum of the data as it is received so that it can compare that sum to the bytes in the CHECK-SUM location of the message stream. If the running CHECK-SUM does not match the received CHECK-SUM field transmitted by the LCP paging device, the LCP gateway or terminal would be programmed to automatically request re-transmission of the message packet, because an error in transmission or reception has thus occurred.

4. LCP Device Operation

Figure 5:
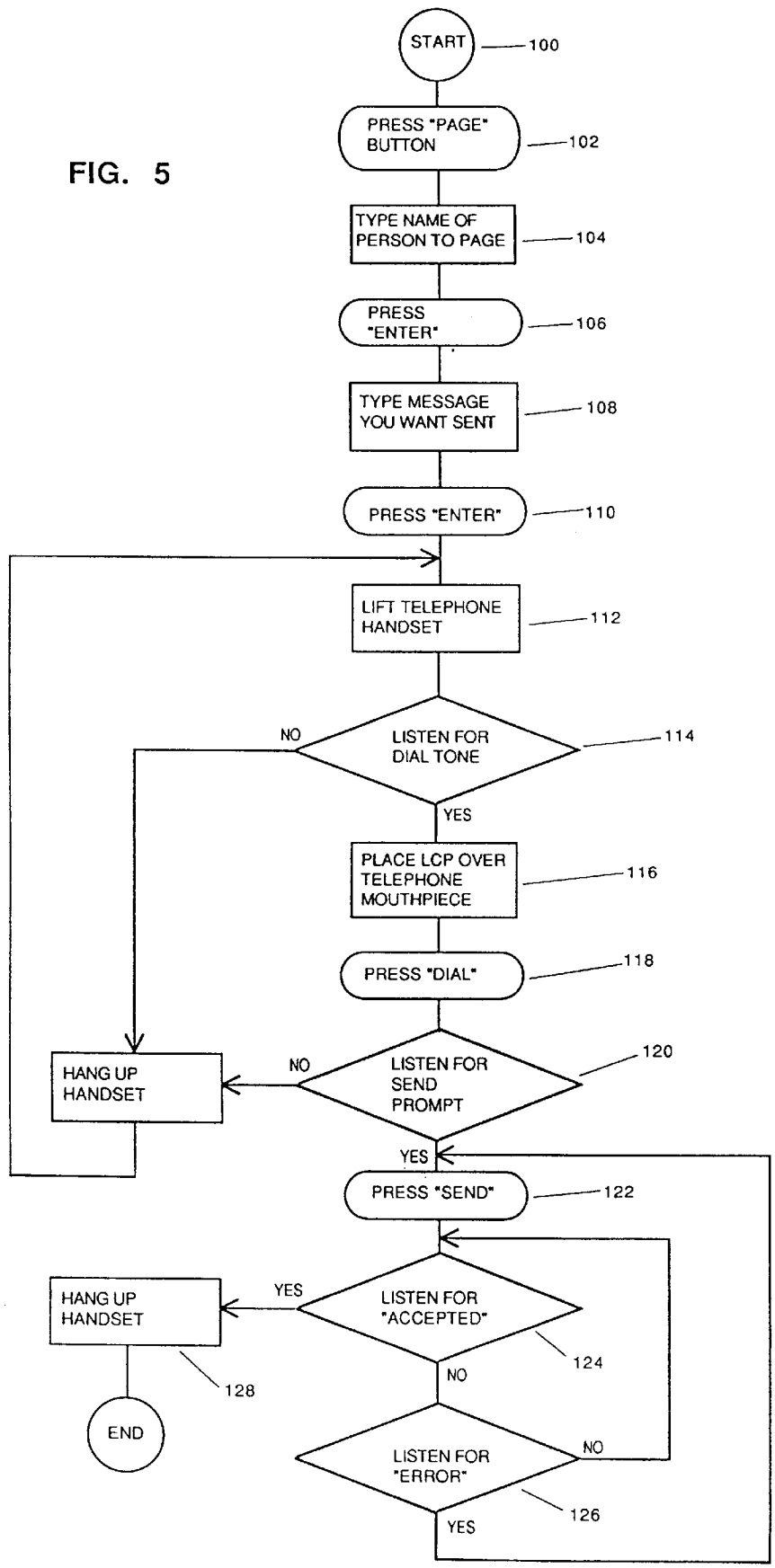
FIG. 5 is a flow chart illustrating the operation, from the user's point of view, of the device of FIG. 1.

FIG. 5 illustrates a flow chart of the operation of a low cost paging device constructed in accordance with the invention by a user. The start of the flow chart, representing the rest state of the device, is indicated at 100. To initiate a paging operation, the user presses the PAGE button 20 on the front face of the device 10. This step is indicated at 102. Next, the user is prompted by a display generated on the alphanumeric display 12 to enter the name of the recipient to be paged. The user types the name of the recipient, and presses the ENTER button 18 on the front of the device, to indicate that that process is completed, as indicated at method step 106. In method step 108 the user types the message that he or she desires to send. When the user has completed formulating the message to be sent, the user presses ENTER again, as indicated at method step 110. Next, as indicated at method step 112, the user picks up the telephone handset and, as indicated at method step 114, listens for the usual audible dial tone. Obviously, if there is no dial tone, the user hangs up the handset and looks for another telephone. If a dial tone is received, the user places the low cost paging (LCP) device 10 over the mouthpiece of the telephone, as indicated at method step 116 in FIG. 6. Then, at method step 118, the user presses the DIAL button 22. The LCP device 10 then uses DTMF tones to automatically dial the gateway to prepare for message transmission. The gateway is programmed to, once a telephone connection is made, send an audible acknowledgment to the user indicating that the message may be transmitted. This audible message can be either a tone sequence conveying a specific meaning known to the user or can actually be a recorded digital or analog human voice saying something like, "Send your page now." At method step 120, the user listens for this audible prompt from the system or the gateway to send the message. When the user has received the prompt, the user, at method step 122, simply presses the SEND button 24. This causes the LCP device 10 to automatically format and transmit the message, as a stream of Baudot tones, out the speaker 24 into the mouthpiece of the telephone. The tone stream is transmitted over the telephone connection to the remote LCP gateway or LCP terminal. The remote gateway or terminal may check the authorization of the USER-ID, and also analyzes the message and the CHECK-SUM at the end of it to verify that no information has been lost in the transmission process. If the user is authorized, the message is successfully received, and the CHECK-SUMs match, the gateway or terminal sends an audible message to the user. This receipt message again may be a tone having specific meaning to the user of can be a synthetic or recorded human voice saying something like, "Page Received." Thus, at method step 124, the user listens to receive whether or not the page accepted message is sent by the gateway or terminal. If the accepted message is not received, the user listens for the error message at 126 which would inform the user to re-initiate sending of the message. When a successful send acknowledgment is received at method step 124, the user then hangs up the handset to complete the interaction as indicated at method step 128.

Figure 6:
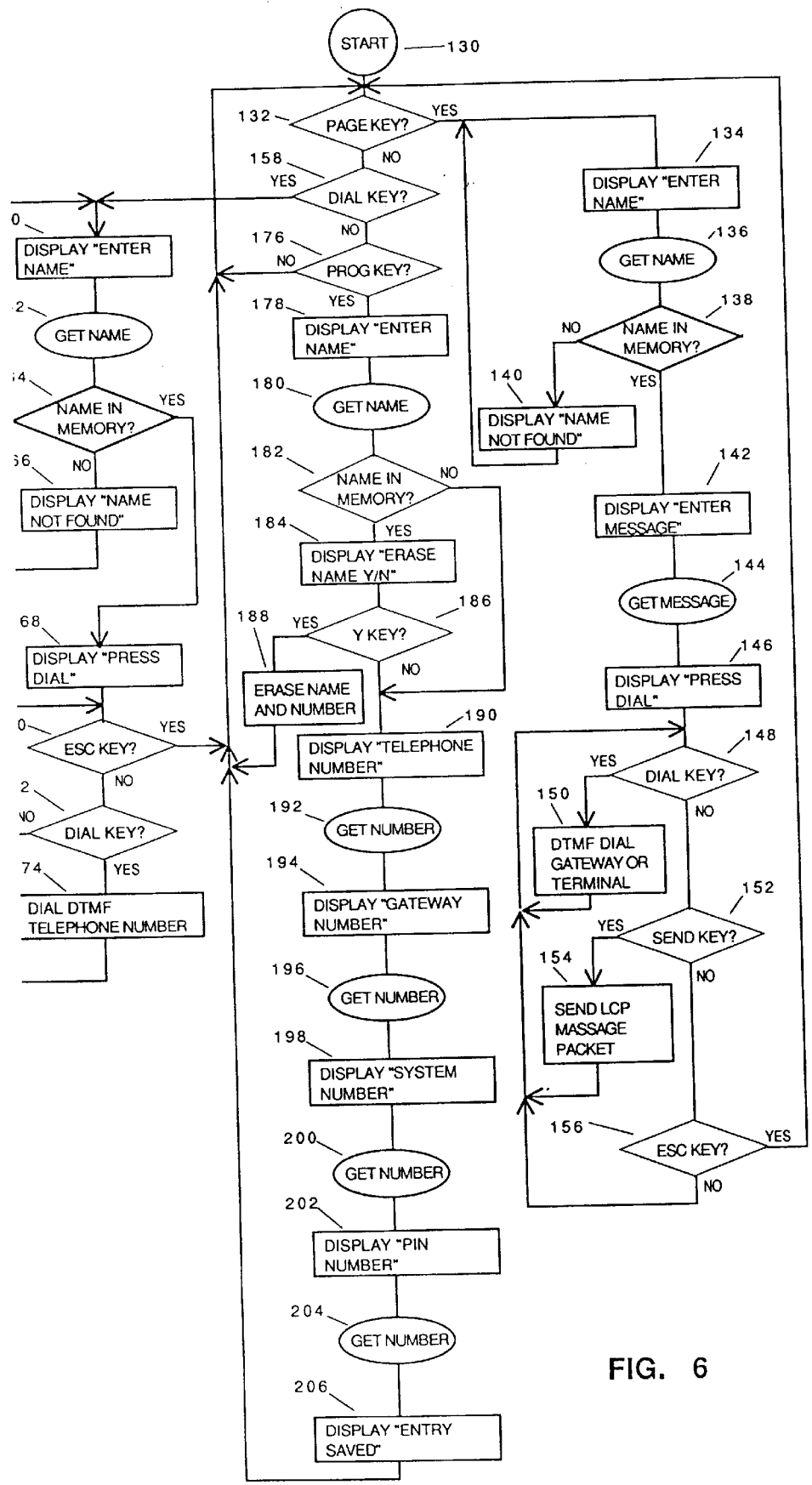
FIG. 6 is a flow chart illustrating the operation of the device of FIG. 1, from the device's perspective.

Illustrated in FIG. 6 is a flow chart of the overall internal operation of the LCP device 10. The start in this flow chart is indicated at 130. Operation of the LCP device 10 is initiated by the user pressing one of the keys. The three possible initiating keys are the PAGE key, the DIAL key, and the PROG key. They will be discussed in order.

If the user presses the PAGE key, as indicated at step 132, the LCP device 10 then generates a prompt on the alphanumeric display 12 which indicates to the user to enter the name of the intended recipient of the page, this being indicated by method step 134. At data input step 136, the user types in the name of the designated recipient. At method step 138, the LCP device examines to see whether or not the name of that individual matches a name stored in its memory. Since initiation of a paging function with the PAGE key is only intended to be effective if the name is found in the memory, if the answer at method step 138 is no, the system will make a display, indicated at 140, indicating that the name was not found and ask for a new name to be entered. If the name is found in the memory, then the LCP device generates a prompt, indicated at method step 142, asking the user to input the message. At step 144 the user types the message into the device. At method step 146, the LCP device prompts the user, following the end of the message, to "Press Dial" indicating that the user is to place the device in the telephone handset and press the dial button 22. When the user presses the dial button, as indicated at method step 148, the LCP device uses the DTMF tones to dial the gateway or terminal using the number which has been previously programmed into its memory. The device then waits for the user to press the send key, as indicated at method step 152. When the user presses the send key indicated at method step 152, the system, as indicated at method step 154, formats and sends the LCP message packet to the gateway or terminal. The system then waits until the user presses the escape key, indicated at method step 156, before returning to its start status.

The USER-ID function is not intended to be altered by the user. It is intended to be a permanent identification number assigned to the device that is associated by the LCP system with an identified user having a page sending account. It may be desirable, in some instances, to permit sales associates of technicians to alter this number using a special access code or hardware.

The low cost paging device also be used as a simple telephone dialer. Since the device has the capability to generate DTMF tones for the purpose of automatically dialing the paging gateway or terminal and also has the capability to remember telephone numbers in its memory, the device can easily be programmed to use this facility to also serve as an auto-dialer. The utilize this option, the user presses the DIAL button 22, as indicated at method step 158.

At step 160, the device 10 responds by displaying a prompt for the user, such as "Enter Name," to prompt the user to enter the name or code number of the intended recipient. At method step 162, the device retrieves the name from its memory. If the retrieval is unsuccessful, then at method step 164, the device displays a notice to the user that the name could not be found (step 166), and then the operation returns to the user prompt at 160. If the memory successfully retrieves the recipient's telephone number from its memory, the device then displays a prompt to the user, at step 168, inviting the user to press the dial button which, in this case, will initiate the dial only. The user then places the speaker of the device over the handset of the telephone. Unless the user presses the ESCAPE key (step 170) and after the user presses the DIAL button (step 172), the device then generates the DTMF tones to dial the telephone number of the intended recipient of the telephone call, as illustrated at step 174.

Since the alphanumeric paging entry device 10 incorporates a memory to automate certain of its functions, it is necessary to provide a procedure for the user to program in the device with the information for the telephone and PIN numbers which the user will use. This procedure begins when the user presses the PROG (program) button 16, as indicated at method step 176. Following that action, the device, at method step 178, prompts the user to enter the name of the recipient to be entered into the memory. The user, at step 180, enters the name of the intended recipient into the device using the keyboard. The device checks, at method step 182, to see if the name has already been entered into its memory. If the answer is "Yes," the device then interrogates the user as to whether or not it is intended that the prior information for a recipient of that name be erased, as indicated at step 184. If the user presses the "Y" key, a query step indicated at 186, indicating that the number is to be erased, the procedure branches to step 188 where information about the name and number is erased, after which the system returns to the start state. If the user indicates "NO" in step 186 or if the name was not in memory at step 182, then the device displays a prompt asking the user to input a telephone number for the recipient at step 190. This telephone number is the personal telephone number of the recipient for auto-dialing purposes. The user inputs the telephone number into the device at step 192. Then the device, at step 194, prompts the user for the number of the LCP gateway, followed by the user, at step 196, entering the number into the keyboard. If the user is a subscriber of a system which does not use a gateway, but includes terminals capable of directly receiving LCP format input, then the users presses a key to indicated that no gateway number is to be used. Then at step 198, the device prompts the user for the telephone number of the terminal for the paging system to which the recipient is a subscriber, followed by the user, at step 200, entering the telephone number of the paging terminal into the device. The device then, at step 202, prompts the user to type in the PIN number of the intended recipient, and the user inputs that particular number at step 206, after which the device returns to its beginning state.

Note that there are several features of the LCP device 10 which permits it to be manufactured and sold as a low cost device while still being capable of efficiently sending alphanumeric messages into a paging system. The fact that the device uses Baudot tones and the LCP massage format avoid the use of computer-compatible modem circuits. In addition, the fact that the output tones are relatively low-frequency audible tones (1400 and 1800 Hertz), makes it possible for the microprocessor 30 to actually generates the tones directly from its internal programming, without requiring an external tone generator or circuitry. Minimal external circuitry is required to generate acceptable DTMF tones. The microprocessor can be programmed to first generate the DTMF tones for the dialing operation followed by the Baudot tones for the LCP message. The device works with any telephone, and thus can be operated from any location, but is not physically coupled to the telephone and so does not involve the governmental regulatory role involved when devices are wired into the telephone system. While, as an alternative, the DTMF tones could also be used to send the LCP message, use of those tones is inherently less efficient and slower that the use of the Turbo Code protocol. Since handshake is not required, the time delay of handshake is avoided. The LCP device 10 is also small enough to be easily hand carried and can be carried in a pocket.

In its operation, the use of the two conspicuous and large keys, the DIAL key and the SEND key lend particular user-friendliness to the device. In spite of the small size of the device 10 and the fact that the device must be physically held against the handset of the telephone, the user can still readily operate the device to send the message since that action involves only pressing the two largest and most easily reached buttons on the device. It is also a helpful that these two important keys are physically located on the device 10 on the opposite side of, and directly above, the speaker which is placed against the handset, thus ensuring that there is something to press against when it is time to press these two buttons. The efficiency and low cost of the LCP device is made possible in part because the user is used as a part of the feedback system. Accordingly the device which interacts with the LCP device must be designed accordingly.

5. LCP System Gateways

At the other end of the telephone line must be a device which can properly interface with an LCP input device and which can then provide a message stream which is transmitted to the recipient. Eventually, an input device could be provided to paging systems so that LCP format messages could be received directly into the paging system. As an alternative, however, the availability of LCP gateways makes it possible to implement the LCP system immediately without waiting for paging systems to design, or install new hardware. The function of the gateway is to serve as an intermediary paging message conduit between the user and the paging system.

Figure 7:
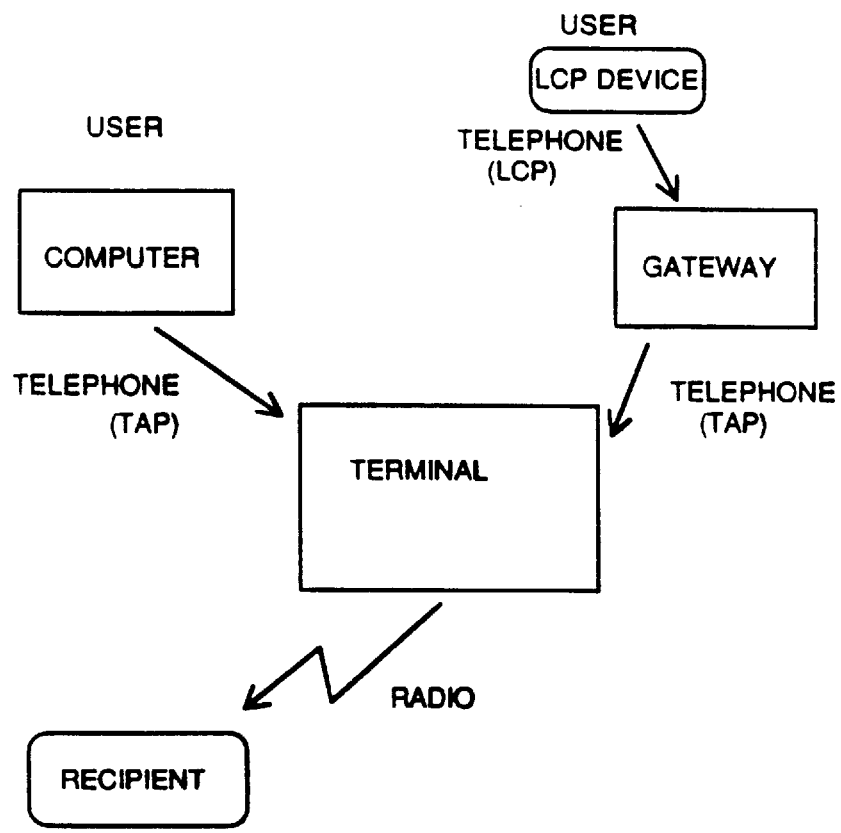
FIG. 7 is a schematic illustration illustrating the role of the gateway device.

The differences in the route of the message are illustrated in FIG. 7. In a conventional alphanumeric entry system, the user uses a computer or modem capable device 210 to dial the terminal 212 using a telephone line 214. In this conventional alternative, the message is sent to the terminal in TAP, or other conventional paging message format. Using an LCP device with an LCP gateway, the user programs the LCP device 10 to dial the gateway, indicated at 216, which is programmed to provide appropriate prompts to the user so that the user operates the LCP device 10 to send the LCP message packet to the gateway 216 over the telephone line 218. The LCP gateway 216, which is modem-capable, then reformats the message and transmits the message in the appropriate conventional paging input format, e.g. TAP, to the terminal 212 of the paging system. If is for this function that the LCP device 10 transmits the SYSTEM-NUMBER in the LCP message format, so that the same LCP gateway 216 can be used with a number of different conventional paging systems. The SYSTEM-NUMBER tells the LCP gateway 216 which of terminal 212 to dial.

It is specifically envisioned here that there can be two rather different approaches to the design and construction of such LCP gateways. One approach is a centralized or macro gateway and the other approach is a decentralized or micro gateway.

For a centralized gateway, a high volume, computer-controlled central facility can be designed which can answer many telephone lines in parallel to receive many simultaneous LCP paging messages. The computer of the facility can them communicate with the various paging systems, through which the pages are sent to the recipients, by large capacity dedicated communication lines, to send paging messages in bulk for distribution to recipients. The centralized facility could be accessed by users by toll-free telephone lines or, if a sender-paid system is desired, by a toll charge telephone connection in which the user or sender pays a small fee for the transmission of the paging message as a part of the cost of the telephone call to the facility. The volume and scale of such a facility would make the individual cost of each paging message relatively small.

Alternatively, it is also envisioned that decentralized LCP gateways can be made available to many businesses, and even private homes. One of the features of the LCP system design is that it permits relatively modest upgrading of existing alphanumeric entry devices (AEDs) to not only become LCP compatible, but also to become capable of serving as a decentralized, private LCP gateway. The art contains examples of digital electronic devices or appliances which are specifically designed to be alphanumeric input devices for alphanumeric paging systems. Such devices typically communicate with other digital devices using one of another of the various duplex computer-to-computer communication formats, such as TAP. Often such devices operate under the control of a central microprocessor. It is disclosed here that such devices have almost all of the hardware necessary to serve as an LCP gateway, with only the addition of a simple Baudot tone recognition circuit being required, and some software procedures implemented, to provide a readily manufacturable and economical LCP gateway device.

6. Decentralized LCP gateway

Figure 8:
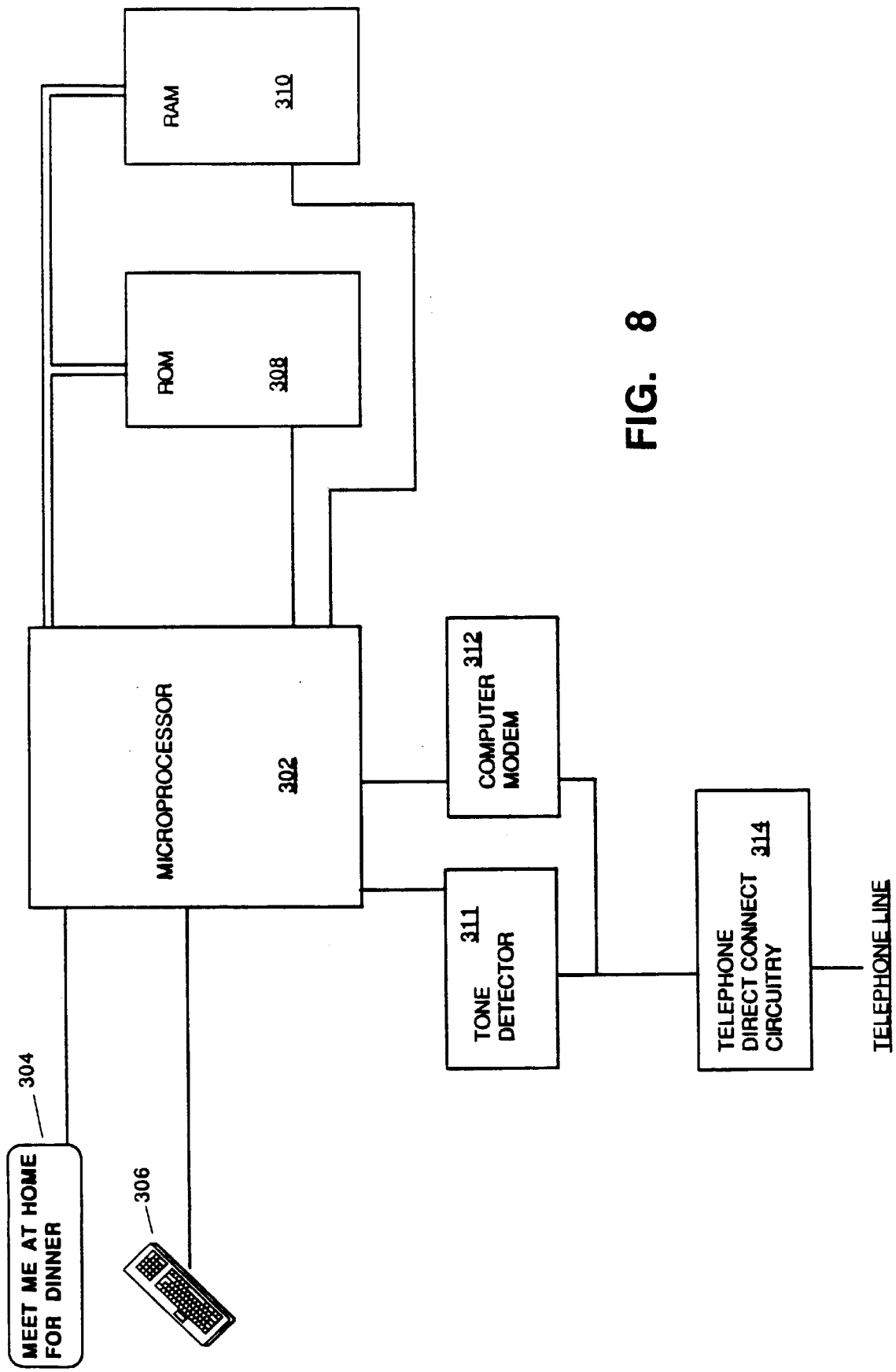
FIG. 8 is a flow-chart illustrating the operation of the most basic gateway device.

Shown in FIG. 8 is a schematic diagram of a device or appliance which can function as either an alphanumeric message input device ("AED") or an decentralized or micro LCP gateway. The micro gateway device/AED device of FIG. 8 is built around a microprocessor designated by the reference numeral 302 in FIG. 8. The microprocessor is connected to a visual display, such as an LCD module or a CRT screen 304. A user of the device has access to a keyboard 306 also connected to the microprocessor 302. The keyboard is thus the data entry device for the user while the display is the feedback from the device to the user. A read-only-memory (ROM) 308 contains the program for the microprocessor 302 while a random access memory (RAM) 310 provides data storage capability to the device. The microprocessor 302 is connected to telephone direct circuitry 314 by both a conventional duplex computer modem 312 and by a tone detector 311 intended to detect Baudot tones. The modem 312 and the tone detector 311 serve as an analog interface circuit for the digital microprocessor 302 to the telephone line. The device of FIG. 8 could also include, if desired, a separate telephone DTMF keypad, a printer, or a telephone handset, although none are required for the minimal, and therefore most economical, unit.

Of the components illustrated in FIG. 1 in block fashion, only two require additional description. The telephone connect circuitry 314 need only include amplifiers, transformers or other buffer devices to simply isolate any resistive loads in the device from the telephone line. The connection to the telephone direct circuitry may include two types of circuitry, both of which in themselves are known to those of skill in the art. One set of the circuitry is a conventional computer modulator/demodulator or modem 312, which is capable of sending and receiving digital data transmissions in a computer-to-computer paging transmission format, such as TAP. Modem integrated circuits are readily commercially available. The second set of circuitry is the tone detector 311 configured to detect and decode any tones received over the telephone line at the frequencies of the LCP format, i.e. the 1400 and 1800 hertz tones. The tone detector 311 can be accomplished by several relatively economical circuit designs, such a notch filter or frequency detector, but is preferably implemented by two phase-lock-loop circuits, one tuned to each of the two frequencies. The outputs of such phase lock loops can be fed directly into the microprocessor, which can readily be programmed to decode the digital spaces and marks. As an alternative to a discrete tone detector 311 and modem 312, both functions can be combined in a digital signal processing circuit, using any one of a number of integrated circuits designed for that purpose, which is then operated under software control to both perform computer compatible modem operation and detection of Baudot tones. This relatively simple tone detect circuitry to detect and decode the LCP code tone is all the hardware which must be added to an alphanumeric paging message entry device to make it capable of LCP gateway operation. The remaining capability of the gateway is made possible by the software operating the gateway, as described further below.

Figure 9:
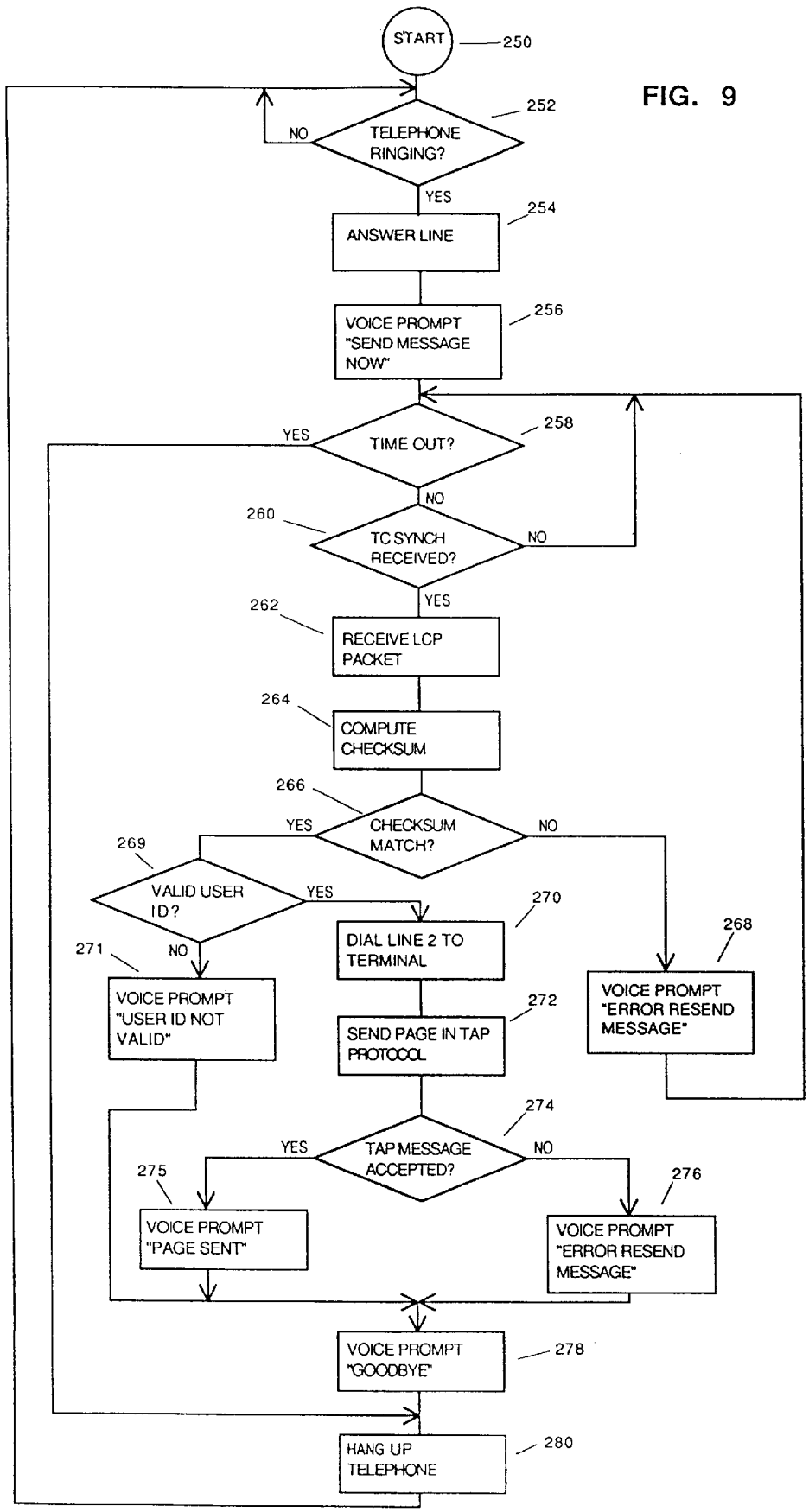
FIG. 9 is a schematic illustration of the electronic components of a gateway constructed in accordance with the present invention.

Shown in FIG. 9 is a flow chart illustrating the stereotypical method of operation of the message reception by the LCP gateway 216. This is the preferred method of operation for an LCP gateway that has been provided with two dedicated telephone lines. As will be described below, this format is preferably modified when the LCP gateway uses a single line or even shares a telephone line with other functions or devices. The flow chart starts at 250, and in step 252, the gateway waits for the rings of its input telephone. In step 254, after the telephone rings, the gateway answers the line. The gateway then, at step 256, generates the user audible signal or prompt, sent out over the telephone line to the user to inform the user that the gateway has answered. The audible signal could be a tone or tones that the user recognizes as the characteristic answer by the LCP gateway, of could be a digitally recorded voice saying something like, "Send Message Now," as illustrated in FIG. 9. At step 258, the gateway then waits for input tones to be received, and ultimately time out, if the input of an LCP message is not forthcoming. In step 260, the gateway listens for the input SYNCH signal indicating the start of an LCP message. If a SYNCH signal message is not received, the gateway times out and resets. If a SYNCH character from the LCP format is received, the gateway then receives the message packet, as indicated at 262. The gateway computes the a checksum as the message is received (step 264) using the same algorithm as the LCP device 10, and the calculated checksum is compared to the CHECK-SUM portion of the LCP message packet at step 266 to see if they match. If a match is not made, the gateway provides a voice announcement to the user that an error was made, as indicated at 268, and restarts the message transmission process. If a match is made, the gateway can then check the USER-ID in the message packet, at step 269, to verify that the sender has an account, is authorized to use the gateway, and also to record the user's identification for later billing purposes. The step 269 can be omitted for a truly private LCP gateway, but is particularly useful in a sender-pays paging system. If user identification is enabled, and if the USER-ID is not authorized, the gateway, as indicated at step 217, sends the user a verbal message to that effect and terminates the call. If user identification is not used, or if the user is properly authorized, the gateway then dials out on its other telephone line to dial the terminal of the paging system indicated in the LCP packet, this being represented at 270. The gateway then sends the message to the terminal in the conventional paging format of the terminal, such as TAP, as indicated at 272. If the transmission to the terminal is successful, the gateway presents a verbal message to the user indicating that the message was successfully sent in step 274. If the message is not accepted by the terminal, the gateway informs the user of an error, as indicated at 276. The gateway then gives a departure signoff at 278 and hangs up at 280, to return to its start state. Through this process, not only has the page been entered into the paging system, but the user has been provided with audible feedback or verification that the paging has been send into the paging system. This feature is possible when two telephone lines are used for the LCP gateway, but must be modified is only a single line or a shared line is used.

When a single or shared telephone line is used, some additional intelligence, i.e. software, must be included in the combined AED/gateway device. The oneline AED/gateway will accept the input LCP message and acknowledge receipt of it, but cannot send the page on the paging system while the user is on-line, since it only has access to one telephone line. Thus, in this version, steps 270, 272, and 274 would be omitted from the procedure flow-charted in FIG. 9. Instead, the device would wait until the user hangs up, and then dial the paging system to transmit the TAP protocol paging message to the paging system. The user would, in this method of operation, receive confirmation that the message was received by the gateway, but would not receive on-line confirmation that the message was transmitted to the paging system.

The combined gateway/AED device described here is economical enough to be considered for household use. In that event, the device is unlikely to have its own telephone line, instead being required to share perhaps both with people and with other devices, such as telephone answering machines. Many households have several telephones on a single telephone line, and many also have a telephone answering machine on that line. Again, this arrangement can be accommodated by alternatives of software implemented in the device of FIGS. 8 and 9, with one additional hardware requirement. The hardware which interfaces to the telephone line would need to be able to monitor the line, without lowering the apparent impedance on the telephone line, and then also be able to lower the impedance as if a telephone was picked up. In the language of the art, the gateway has to present on-hook impedance on the telephone line unless and until it desires to answer the call, in which case it presents an off-hook impedance to the line. It is well known in the telephony art that high-impedance passive line monitoring (i.e. on-hook impedance) is possible, to monitor incoming signals on a telephone line, without imposing an impedance drop on the line (i.e. off-hook impedance) which would indicate to the telephone system that the line has been answered. The combined AED/gateway device would have this capability. The device would then use this capability to take over or answer the telephone line by presenting off-hook impedance only when the first LCP tones of the LCP synch signal are received over the telephone line.

Consider two possibilities, either a person or an answering machine answers another extension on the same telephone line. If a person answers, the remote user, desiring to use the gateway to send an LCP page, simply tells the person answering to hang up, and then the user begins the LCP transmission. The AED/gateway device, which has been passively listening throughout, then responds to the LCP message as normal, and answers the line so that it can send audible feedback to the remote user. After the user completes the LCP message transmission, the user hangs up and the gateway re-transmits the message to the paging system.

In the case of an answering machine, many modern answering machines are equipped with a feature by which they also monitor the status of the impedance load on the telephone line. The answering machines do this so that, if the machine is in the course of answering the line and then a person picks up an extension, the s machine senses from the off-hook impedance that a person has picked up, and then shuts off to prevent the machine from interfering in the person-to-person conversation. The AED/gateway device takes advantage of that feature by the following stratagem. The gateway waits for an LCP tone, even after the answering machine answers the line while presenting on-hook impedance. If the user starts an LCP message transmission, the gateway detects the synchronization signal and immediately imposes an off-hook impedance on the telephone line, to cause the answering machine to sense that another extensions has been picked up. For many modern answering machines, that will cause them to shut off. In any event, if the answering machine does not shut off, the answering machine will simply stay on the line and record a very brief series of tones representing the LCP message packet. There is some chance that the answering machine handing up will introduce noise in the LCP transmission. If that occurs, the check-sum will not match and the gateway will send an audible signal to the user to re-send.

Note that the device operating containing the circuit elements of FIG. 8 and operating under the method of FIG. 9 may still be independently used as an alphanumeric paging message entry device itself. The device can be provided with either a switch, or a software selection, to enable the device to switch between gateway operation, monitoring the telephone line in for LCP messages, and interactive user by a local user who desires paging messages. Alternatively, the device can be programmed to default to gateway monitoring operation, and then to respond as a simple alphanumeric entry device whenever someone starts entering a message onto its keyboard. Since it is a specific advantage of the gateway implementation described here that the modifications required for the gateway function, over those required just for alphanumeric paging entry function, are so economical, that this gateway capability can be built into most, if not all, desk top or line-connected alphanumeric entry devices sold to the public for entering paging messages. The device can sit on the desktop, next to the telephone and plugged into the telephone line between the telephone and the wall jack. The combined AED/gateway device is normally in a rest mode acting as a gateway, and monitoring the input line. When the user begins typing, the device would preferable convert to alphanumeric entry mode for use by the local user and lock out the gateway function until the paging message has been sent (in conventional TAP to the paging system). If the gateway is in the process of receiving an LCP message when the user desires to send a page, the local user would receive a message on the display 304 informing him that he is locked out until the LCP gateway operation is over. Of course, with sufficient microprocessor power and sophistication, multitasking of both operations in parallel could be accomplished, although that might add significantly to the cost of the device.

Note that a gateway, public or private, would require some set-up as well. For example, assuming USER-ID is used, the gateway would be provided with a list or table of approved users who could use the gateway. This is the list or table that the gateway would consult to determine if a user is authorized, and to bill that page to the user in a user-pays system. Similarly, the gateway might store the telephone number of the paging system or systems it sends messages to. A local or decentralized gateway would need a set up process to set up the method of operation (i.e. one-line or two-line) and other similar options.

It is to be understood that the present invention is not limited to the embodiments described above, but embraces all such modified forms thereof as come within the scope of the following claims.

What is claimed is:

1. A system for entering alphanumeric messages intended for a recipient subscriber to a paging system, the system comprising a gateway for receipt and retransmission of the message to a terminal of the paging system, the gateway capable of providing verbal prompts to the user over a telephone line;

a hand-held paging entry device including an alphanumeric keyboard containing individual keys for the full alphabet, a speaker, and a memory capacity to contain a (i) an alphanumeric message for the recipient previously entered into the memory capacity, (ii) the telephone number of the gateway, (iii) the telephone number of the paging system, and (iv) the PIN of the recipient, the device also including a send button causing the device to generate a simplex audible tone sequence, composed of tones of 1400 and 1800 hertz, carrying the telephone number of the paging system, the PIN of the recipient and the previously entered alphanumeric message intended for the recipient;

the gateway being capable of receiving and decoding the alphanumeric message from the audible tone sequence device over a telephone line and reformatting and transmitting the alphanumeric message over a telephone line in a conventional duplex paging message format to the paging system of the recipient.

2. A system as claimed in claim 1 wherein the audible tone sequence carrying the telephone number of the paging system, the PIN number of the recipient, and the message is made up of Baudot tones encoding an ASCII character set.

3. A system as claimed in claim 1 wherein the audible tone sequence also includes an identification number of one of the user and the device.

4. A low cost paging gateway for transmitting alphanumeric paging messages to a paging system to which a recipient subscribes, the gateway comprising an alphanumeric keyboard to receive input from a person;

a display to display characters to a person;

a microprocessor operating in accordance with a stored program code and connected to accept input from the keyboard and to display such input on the display;

an analog interface circuit connected to the microprocessor and to a telephone line, the analog circuit including circuitry to detect and decode 1400 and 1800 hertz simplex tone signals on the telephone line; and a memory connected to the microprocessor containing the program code for operation of the microprocessor to control operation of the device to perform the following operation:

(i) provide on the telephone line a human-audible prompt to a remote human user to indicate that the device is prepared to receive a simplex alphanumeric paging message from a remote user over the telephone line;

(ii) detect and decode simplex 1400 and 1800 hertz tone signals received on the telephone line as digital data representing an identification code associated with the remote user, a PIN number identifying an alphanumeric paging recipient and paging message intended for the paging recipient;

(iii) store the digital data in the memory;

(iv) consult a table of authorized users to determine if the user is authorized to use the gateway; and (v) if the user is authorized, send the alphanumeric paging message to the recipient by reformatting the paging message into a conventional alphanumeric paging message format and transmitting the reformatted message to the paging system used by the recipient.

5. A gateway as claimed in claim 4 wherein the tone signals also include a checksum and wherein the program code further causes the gateway to generate a checksum as the tone signals are received, the gateway then providing a second human audible prompt to the user if the paging message is successfully received.

6. A gateway as claimed in claim 4 wherein the gateway also includes a computer modem and the gateway is programmed to, after receiving a paging message from a user, to send the message to the recipient by dialing a terminal of a paging system and sending the paging message to the terminal in a conventional duplex paging message format.

7. A device as claimed in claim 4 wherein the human audible prompt are a tone signal.

8. A device as claimed in claim 4 wherein the human audible prompt is digitally created human voice.

* * * * *